(12) United States Patent
Miller

(10) Patent No.: US 9,046,078 B2
(45) Date of Patent: Jun. 2, 2015

(54) ROTOR BLADE DRAIN

(75) Inventor: Alexander Miller, Munster (DE)

(73) Assignee: Kenersys GMBH, Munster (DE)

( * ) Notice: Subject to any disclaimer, the term of this patent is extended or adjusted under 35 U.S.C. 154(b) by 448 days.

(21) Appl. No.: 13/583,759

(22) PCT Filed: Mar. 11, 2011

(86) PCT No.: PCT/EP2011/053711
§ 371 (c)(1), (2), (4) Date: Sep. 10, 2012

(87) PCT Pub. No.: WO2011/113764
PCT Pub. Date: Sep. 22, 2011

(65) Prior Publication Data
US 2013/0045100 A1    Feb. 21, 2013

(30) Foreign Application Priority Data
Mar. 13, 2010  (DE) .......................... 10 2010 011 275

(51) Int. Cl.
  *F01D 7/00*   (2006.01)
  *F03B 3/14*   (2006.01)
  *F03D 1/06*   (2006.01)

(52) U.S. Cl.
  CPC ................ *F03D 1/06* (2013.01); *F03D 1/0675* (2013.01); *F05B 2250/40* (2013.01); *F05B 2260/602* (2013.01); *F05B 2260/64* (2013.01); *Y02E 10/721* (2013.01); *F16C 2360/31* (2013.01)

(58) Field of Classification Search
  USPC .............. 415/169.1, 169.2, 169.4; 416/23, 24, 416/87, 88, 90 R, 92, 228
  See application file for complete search history.

(56) References Cited

U.S. PATENT DOCUMENTS 6,474,945 B1 * 11/2002 Nakasato et al. ................ 416/23
6,966,755 B2 * 11/2005 Garner ............................ 416/87
(Continued)

FOREIGN PATENT DOCUMENTS

DE        19621485       3/1998
DE      102004028916     1/2006
(Continued)

OTHER PUBLICATIONS

International Preliminary Report on Patentability issued Sep. 18, 2012 by the International Searching Authority for international application No. PCT/EP2011/053711 filed Mar. 11, 2011, which later published as WO 2011/113764 on Sep. 22, 2011 (Applicant— Kenersys GMBH // 1st Named Inventor—Miller) (7.
(Continued)

*Primary Examiner* — Richard Edgar
*Assistant Examiner* — Christopher J Hargitt
(74) *Attorney, Agent, or Firm* — Ballard Spahr LLP

(57) ABSTRACT

The invention relates to a rotor blade for a wind power plant comprising a rotor blade body, wherein the rotor blade body encloses a hollow space, wherein the rotor blade body comprises a penetration for draining the hollow space, and a functional element, wherein the functional element is displaceably connected to the rotor blade body and is disposed at the penetration. According to the invention, the functional element can be transferred from a closed position into an open position, wherein the functional element can be displaced purely by translation. Improved drainage is thereby achieved and clogging of the drain is prevented, with reduced noise production.

10 Claims, 1 Drawing Sheet

(56) References Cited

U.S. PATENT DOCUMENTS

| | | | |
|---|---|---|---|
| 8,152,466 B2 * | 4/2012 | Gandhi | 416/88 |
| 2008/0193292 A1 | 8/2008 | Stam | 416/146 |
| 2009/0104022 A1 * | 4/2009 | Suljak et al. | 415/160 |
| 2009/0139739 A1 * | 6/2009 | Hansen | 174/2 |

FOREIGN PATENT DOCUMENTS

| | | |
|---|---|---|
| DE | 102004028917 | 1/2006 |
| DE | 102005019905 | 11/2006 |
| DE | 102008007910 | 8/2008 |
| DE | 102008048617 | 4/2010 |
| DE | 102008054323 | 5/2010 |
| DE | 10201011275 | 9/2011 |
| EP | 2 547 902 | 1/2013 |
| JP | 2005-105916 | 4/2005 |
| WO | WO 02/48546 | 6/2002 |
| WO | WO 2011/113764 | 9/2011 |

OTHER PUBLICATIONS

Written Opinion issued Dec. 19, 2011 by the International Searching Authority for internation application No. PCT/EP2011/053711 filed Mar. 11, 2011, which later published as WO 2011/113764 on Sep. 22, 2011 (Applicant—Kenersys GMBH // 1st Named Inventor—Miller) (6 pages).

International Search Report issued Dec. 19, 2011 by the International Searching Authority for international application No. PCT/EP2011/053711 filed Mar. 11, 2011, which later published as WO 2011/113764 on Sep. 22, 2011 (Applicant—Kenersys GMBH // 1st Named Inventor—Miller) (4 pages).

Office Action from the German Patent Office issued Apr. 4, 2011 for German application No. DE 102010011275 (Applicant—Kenersys GMBH // 1st Named Inventor—Miller) (5 pages).

\* cited by examiner

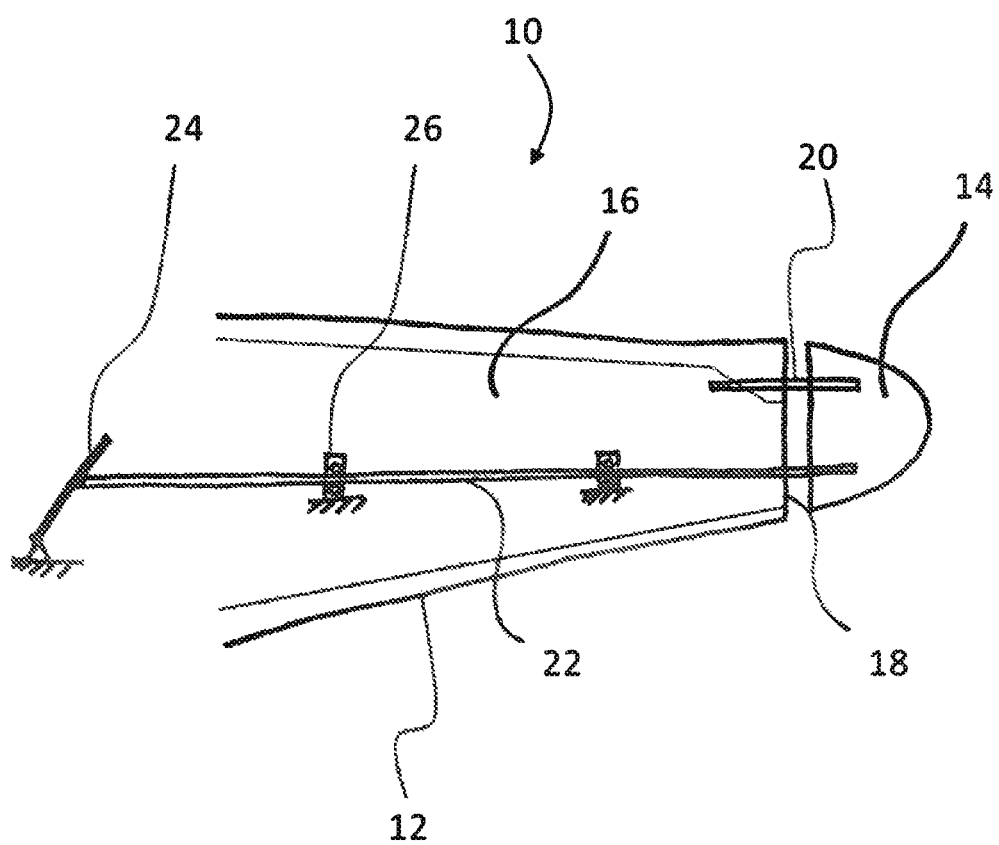

ROTOR BLADE DRAIN

CROSS REFERENCE TO RELATED APPLICATIONS

The present application is a National Phase Application of International Application No. PCT/EP2011/053711, filed Mar. 11, 2011, which claims priority to German Patent Application No. 10 2010 011275.5, filed Mar. 13, 2010, which applications are incorporated herein fully by this reference.

The invention relates to a rotor blade for a wind power plant.

Modern wind power plants normally have rotor blades which can comprise lengths of 40 m or more, for example. For this purpose, the rotor blades are normally produced from half-shells, wherein hollow spaces are formed between the half-shells at least partially. As a result of condensation or by direct penetration of moisture, liquid water can accumulate in the hollow spaces. Particularly during the winter, the rotor blades may be damaged if the water freezes, or by sudden vaporization during a lightning strike. As shown in DE 10 2004 028 917 A1, openings are therefore disposed in the tip of the rotor blade, for example, for draining this water.

The disadvantage of the known measures for the drainage of rotor blades is that as the size of the drainage apertures becomes larger, the noise generation also increases, because of the high face velocity of the rotor blade. In addition, dirt and small particulates in solution frequently clog the drainage apertures.

The purpose of the invention therefore is to provide a rotor blade with improved drainage and reduced noise generation and which improves to prevent the drainage apertures from clogging.

The invention teaches that this problem is solved by the Features of claim 1. Advantageous embodiments of the invention can be found in the sub-claims.

The rotor blade for a wind power plant as taught by the invention comprises a rotor blade body, wherein the rotor blade body encloses a hollow space, wherein the rotor blade body comprises a penetration for draining the hollow space, and a functional element, wherein the functional element is displaceably connected with the rotor blade body and is disposed at the penetration. The invention teaches that the functional element can be transferred from a closed position into an open position, wherein the functional element can be displaced purely by translation.

The functional element is disposed at the rotor blade as taught by the invention such that the penetration for draining the hollow space is sealed water-tight or is at least covered in the closed position. In the open position, the functional element is disposed such that the penetration is not covered or closed, or only partially. In this context, the functional element can be designed to be solid, i.e. without a hollow space, comprise a recess, or be designed that it encloses the hollow space of the functional element. In this context, in the closed condition, the hollow space of the functional element can adjoin the hollow space of the rotor blade body contiguously. The transfer of the functional element from the closed position into the open position can advantageously be stepless for this purpose. In this context, the displacement of the functional element is performed by a purely translational displacement along a longitudinal axis of the rotor blade or of the rotor blade body without twisting or rotating the functional element about the longitudinal axis of the rotor blade or the rotor blade body. In the open position, the functional element opens the penetration at least partially, so that water or small particulates can escape from the hollow space of the rotor blade through the penetration, for example.

With the rotor blade design as taught by the invention it is advantageous that a penetration with a large opening can be provided for improved drainage of the hollow space of the rotor blade. The noise development due to the large penetration is prevented in that during normal operation of the wind power plant the penetration is closed water-tight or is at least partially covered by the functional element, as a result of which the penetration is not exposed to the direct flow of air, except if the functional element is briefly transferred into the open position, if needed. A large penetration can moreover ensure that contaminants or small particulates which can drop into the hollow space of a rotor blade when maintenance is performed on the wind power plant, for example, can be safely removed from the hollow space, whereby clogging of the penetration can be prevented. As a result, damage to the rotor blades because of accumulated water in the hollow space can be prevented for example in winter by freezing or by vaporization during a lightning strike. In addition, the purely translational, irrotational transfer of the functional element from the closed position into the open position offers the advantage that no significant change in the inflow angle of the functional element occurs and consequently results only in a very small aerodynamic influence of the rotor blade. This will prevent any material change in performance of the wind power plant by deceleration of the rotor blades, for example.

Preferably it is provided that the penetration is disposed radially outside on the rotor blade. Because of the fact that water or also contaminants or small particulates are moved radially to the outside in the hollow space by centrifugal force during wind power plant operation, a reliable drainage can be ensured by disposing the penetration radially on the outside on the rotor blade body.

In a particularly preferred embodiment of the invention, the penetration is developed on a radial outer end of the rotor blade body, transverse to the longitudinal direction of the rotor blade body. For this purpose, the penetration can be developed in a surface which is disposed transverse or essentially at a right angle to the longitudinal direction of the rotor blade body, for example in a cross-sectional area of the rotor blade body. By disposing the penetration in the cross-sectional area of the rotor blade body on a radial outer end of the rotor blade body in the longitudinal direction, a complete drainage of the hollow space of the rotor blade body can be accomplished.

Pursuant to a preferred embodiment it is moreover provided that the functional element is shaped as the tip of the rotor blade and in the closed position is developed as a surface of the functional element flush-mounted with an external surface of the rotor blade body. By shaping the functional element as the tip of the rotor blade, it is possible that the penetration for drainage can be disposed on the outer end of the rotor blade body on the one hand to facilitate the total drainage of the hollow space without having to consider aerodynamic aspects during the design of the radial outer end of the rotor blade body, since the penetration is covered by the functional element during normal operation. In this context, taking into account aerodynamic aspects, the functional element can be designed as a displaceable rotor blade tip, for example, in order to prevent loss of performance of the wind power plant through formation of vortices, for example. In the closed position, this is particularly ensured by the flush-mounted contact of the surface of the functional element on the outside surface of the rotor blade body, as a result of which the rotor blade body with the functional element contacting the rotor blade body can be subjected to flow favorably like a complete body without any significant aerodynamic interferences and loss of performance. The surfaces of the rotor blade body and/or the functional element which can be subjected to flow in the open position can likewise be designed favorable in terms of aerodynamic flow, to reduce aerodynamically induced noises due to turbulence. The rotor blade tip shaped functional element can be developed hollow for this purpose, wherein the hollow space of the functional element so developed and enclosed by the functional element can be disposed flush with the hollow space of the rotor blade body in the closed condition.

Furthermore it is preferably provided that the functional element can be controlled by means of a control device. As a result, the functional element can be selectively displaced to obtain an opening of the penetration as needed for drainage, for example. In this context, the functional element can remain in the open position for a specific period, before the penetration is closed again. For this purpose, the control device can be connected with the functional element and a servo mechanism. The servo mechanism generates the required forces for keeping the functional element in the closed position, for example, such as during wind power plant operation. The servo mechanism likewise generates the required forces for displacing the functional element from a closed position into an open position, or vice versa. The servo mechanism can generate the required forces both during wind power plant operation, i.e. when the rotor blades are rotating, as well as also when the rotor blades are not rotating. Furthermore, the controller can be regulated with reference to plant operation, so that during light wind and/or in the idling mode, for example, the respective functional element which is pointing down in direction to the ground is activated and opened by the controller. The forces are transferred to the functional element via the control device, and the functional element can thereby be displaced purely by translation. The control device can be designed preferably hydraulic and/or pneumatic, for example. The control device can furthermore be designed electrical and/or mechanical, in the form of a rope winch, for example. Tractive forces which are acting on the rope winch radially directed towards the inside, for example can apply any forces within the hollow space of the rotor blade body that are radially directed to the outside onto the rope winch connected with the functional element by means of re-routing the rope by 180°. As a result, the functional element can be placed into the open position facing radially to the outside. During wind power plant operation, the functional element can be displaced from the closed position into the open position by centrifugal forces which are occurring and are acting on the functional element, for example. The control device can be connected with springs, wherein the springs provide a force which is directed radially to the inside, whereby repositioning and/or keeping the functional element in the closed position can be ensured. The control device can furthermore be produced from an electrically conductive material, such as metal, and be connected to ground and serve as a lightning conductor.

In a particularly preferred embodiment of the invention, the control device is designed in the form of a control rod. For this purpose, the control rod can be designed as single or multi-part rodding. The control rod is connected with the functional element and a servo mechanism, wherein the servo mechanism creates the actuating forces for displacing the functional element. For this purpose it is particularly advantageous that by a simple mechanical structure both the forces for transferring the functional element can be transferred both into the open position as well as the restoring forces for transferring the functional element into the closed position can be transferred from the servo mechanism to the functional element. For this purpose, the control rod facilitates the configuration of the force-generating servo mechanism radially inside from the rotor blade away from the rotor blade tip, for example in the area of a rotor blade suspension. In this way, the action of dynamic forces on the rotor blade during operation as a result of the weight of the servo mechanism can be reduced. The control rod can be produced from an electrically conductive material, such as metal, and be connected to ground and serve as a lightning conductor.

In a preferred embodiment of the invention, the functional element is designed electrically conductive and is grounded. In this way, the functional element can be used as a lightning arrester in the form of a metallic casting or a milled component, for example. By grounding the functional element, for example by connecting the functional element with a lightning conductor, it will be possible to safely arrest electrical energy and prevent damaging the rotor blade or the wind power plant by lightning, for example.

In a further preferred embodiment of the invention, the functional element is produced from composite plastic materials. In this way, functional elements that are particularly light and capable of bearing loads can be produced. Because of the reduced weight compared to metallic functional elements, for example, it is moreover possible to reduce the dynamic forces acting on the rotor blade body. Electrically conductive materials can be embedded into the composite materials, which are then suitable to function as lightning arresters and/or lightning conductors.

Furthermore it is preferably provided that the functional element is displaceably connected with a mounting insert, wherein the form of the mounting insert is matched to the hollow space of the rotor blade body and the mounting insert can be fitted into the hollow space. The mounting insert can be fitted into the hollow space of the rotor blade body and be connected with the rotor blade body. In this way, it is possible, for example, to retrofit a traditional rotor blade with a displaceable functional element as taught by the invention. This can be done for example by removing the original rotor blade tip and fitting the mounting insert with the functional element that is connected with it, for example in the form of an insert which then forms a rotor blade tip which is displaced purely by translation.

The invention furthermore relates to a wind power plant with a rotor blade according to one of the Claims 1 to 9. For this purpose, the rotor blade can be designed and refined as described previously. With the help of the rotor blade as taught by the invention it is possible to obtain improved drainage with reduced noise development, and it is easier to prevent clogging of the drainage.

In the following, the invention is discussed in detail with reference to the enclosed drawing, as follows:

FIG. 1 is a schematic representation of a rotor blade as taught by the invention.

FIG. 1 illustrates the rotor blade 10 as taught by the invention in an open position for a wind power plant. The rotor blade 10 comprises a rotor blade body 12 and a functional element 14. The rotor blade body 12 encloses a hollow space 16 and comprises a penetration 18, which connects the hollow space 16 in the open position so that it is permeable with the environment. The functional element 14 is represented at a distance to the rotor blade body 12 in the open position, and in this open position unblocks the penetration 18, as a result of which the hollow space 16 of the rotor blade body 12 is connected so that it is permeable with the environment.

The functional element 14 is connected with the rotor blade body 12 and guided in the rotor blade body 12 by means of a guide 20 and a control device in the form of a control rod 22, which is supported in the hollow space 16 by means of a bearing 26. For this purpose, the functional element 14 is guided such that the functional element 14, during the transfer from the open position into a closed position and vice versa can only perform a purely translational, irrotational movement in the longitudinal direction of the rotor blade body 12. The control rod 22, by means of which the purely translational movement of the functional element 14 is controlled, is connected with a servo mechanism 24, which is merely diagrammatically represented here. The servo mechanism 24 also generates the forces for the purely translational movement of the functional element 14, which are particularly necessary during wind power plant operation. The servo mechanism 24 also generates the necessary forces during the wind power plant operation for retaining the functional element 14 in the closed position.

List of Reference Symbols
10 Rotor blade
12 Rotor blade body
14 Functional element
16 Hollow space
18 Penetration
20 Guide
22 Control rod
24 Servo mechanism
26 Bearing

The invention claimed is:

1. A rotor blade for a wind power plant, comprising
a rotor blade body (12),
wherein the rotor blade body (12) encloses a hollow space (16), wherein the rotor blade body (12) comprises a penetration (18) for draining the hollow space (16), and a functional element (14),
wherein the functional element (14) is displaceably connected to the rotor blade body (12) and is disposed at the penetration (18),
characterized in that
the functional element (14) can be transferred from a closed position into an open position,
wherein the functional element (14) can be displaced purely by translation.

2. The rotor blade according to claim 1, characterized in that the penetration (18) is disposed radially on the outside of the rotor blade body (12).

3. The rotor blade according to claim 1, characterized in that the penetration (18) is developed on a radial outer end of the rotor blade body (12) transverse to the longitudinal direction of the rotor blade body (12).

4. The rotor blade according to claim 1, characterized in that the functional element (14) is shaped as tip of the rotor blade (10) and that in the closed position a surface of the functional element (14) is developed flush-mounted with an outside surface of the rotor blade body (12).

5. The rotor blade according to claim 1, characterized in that the functional element (14) can be controlled by means of a control device.

6. The rotor blade according to claim 5, characterized in that the control device is designed in the form of a control rod (22).

7. The rotor blade according to claim 1, characterized in that the functional element (14) is designed electrically conductive and is grounded.

8. The rotor blade according to claim 1, characterized in that the functional element (14) is produced from composite plastic materials.

9. The rotor blade according to claim 1, characterized in that the functional element (14) is displaceably connected with a mounting insert, wherein the form of the mounting insert is matched to the hollow space (16) of the rotor blade body (12) and the mounting insert can be fitted into the hollow space (16).

10. A wind power plant, comprising at least one rotor blade (10) according to claim 1.

* * * * *